United States Patent [19]

Trevisan

[11] Patent Number: 5,535,698
[45] Date of Patent: Jul. 16, 1996

[54] ANGULAR POSITION INDICATOR FOR REMOTELY DISPLAYING THE POSITIONS OF VALUE ELEMENTS, ACTUATORS AND THE LIKE

[76] Inventor: Giovanni Trevisan, Via Enrico Fermi, 13, 20090 Cusago (Milano), Italy

[21] Appl. No.: 430,402

[22] Filed: Apr. 28, 1995

[30] Foreign Application Priority Data

Feb. 22, 1995 [IT] Italy .................................. MI95A0329

[51] Int. Cl.⁶ ........................... F16K 37/00; G01O 5/00; G09F 11/02
[52] U.S. Cl. ........................ 116/277; 116/282; 137/556; 40/473; 40/601
[58] Field of Search .................................. 116/277, 282, 116/284, DIG. 21; 137/551, 556, 556.3; 40/473, 601

[56] References Cited

U.S. PATENT DOCUMENTS

| | | | |
|---|---|---|---|
| 681,899 | 9/1901 | Whiteman | 116/277 |
| 824,163 | 6/1906 | Whitney | 116/277 |
| 1,303,801 | 5/1919 | Jones | 116/277 |
| 2,379,517 | 7/1945 | Hadden | 116/277 |
| 4,494,566 | 1/1985 | Sinclair et al. | 116/277 |
| 5,220,942 | 1/1993 | Garvin, Jr. et al. | 137/556 |
| 5,469,805 | 11/1995 | Gibbs | 116/277 |

FOREIGN PATENT DOCUMENTS 1304331  1/1973  United Kingdom .................. 116/282

*Primary Examiner*—William A. Cuchlinski, Jr.
*Assistant Examiner*—Andrew Hirshfeld
*Attorney, Agent, or Firm*—Bucknam and Archer

[57] ABSTRACT

The present invention relates to an angular position indicator for remotely displaying the positions of elements suitable to assume different angular positions, and, more specifically, valve elements, actuators and the like; the indicator comprises a body which can be coupled to the element the angular position thereof must be indicated or displayed, to the body being associated a display unit which is connected to the element being controlled by a device adapted to transform an angular movement into a rectilinear movement.

4 Claims, 3 Drawing Sheets

ANGULAR POSITION INDICATOR FOR REMOTELY DISPLAYING THE POSITIONS OF VALUE ELEMENTS, ACTUATORS AND THE LIKE

BACKGROUND OF THE INVENTION

The present invention relates to an angular position indicator or display device, for remotely displaying the angular positions of element provided for assuming different angular positions and, in particular, valve elements, actuators and the like.

As is known, in several applications there occurs the need of displaying the angular positions of elements which can be turned through angles of 360° or fractions thereof.

For example, in the case of ball or throttle valves, the displacement from an opening position to a closing position is usually performed through a rotation of 90°, and it is frequently necessary to clearly see from the outside the position assumed by the valve element.

At present for meeting the above mentioned requirements there are used very simple approaches, such as small arrows or indicating marks, which are applied, either directly or indirectly, to a projecting portion of a pin coupled to a rotary portion of the valve element, so that the arrow can indicate the assumed angular position.

Such an arrangement, which is actually very economic and simple, has however the drawback that the indication provided thereby can be seen only if it is observed perpendicularly to the axis of the reference arrow, whereas it is scarcely visible if the valve element is seen from a side.

For overcoming the above mentioned problem, there have been made indicating devices having a comparatively high vertical extension and practically comprising colored cylinders, including colored portions which turn rigid with the rotary axis of the valve or of the actuator therefor, within a clear casing, which bears correspondingly opaque portions allowing to selectively see the colored portion of the cylinder depending on the mutual positions thereof, so as to improve the lateral visibility characteristics.

On the other hand, such an embodiment allows only a partial vision, since the visible surface practically corresponds to a half of the side surface.

Another prior approach provides to divide the side surface of the cylindric body into a plurality of vertical rectangles bearing different colors on two faces thereof, said rectangles being caused to rotate by gear means adapted to rotate said rectangles through 180° for each rotation through 90° of the valve.

Thus, with the valve in an open condition, it is possible to see one face whereas, with the valve in a closed condition, it is possible to see the other face.

This arrangement, in addition to being very complex because of the gear means which must be used, has the further disadvantage that it does not allow to satisfactorily see the intermediate positions assumed by the valve element, since in these positions the rectangles are practically arranged on an edge thereof, thereby the angular position of the valve element can not be easily distinguished.

SUMMARY OF THE INVENTION

Accordingly, the aim of the present invention is to overcome the above mentioned drawbacks, by providing an angular position indicator, for remotely displaying the angular positions of elements provided for assuming different angular positions, and, in particular, valve elements, actuators and the like, which allows to easily detect, both frontally and laterally, the angle assumed by the mentioned rotary elements, both at end of stroke positions thereof, that is opening and closure positions, and at intermediate positions thereof.

Within the scope of the above mentioned aim, a main object of the present invention is to provide such an angular position indicator, which allows to obtain a linear type of indication, adapted to satisfactorily display also intermediate positions.

Another object of the present invention is to provide such an angular position indicator which is very reliable and safe in operation.

Yet another object of the present invention is to provide such an angular position indicator which can be easily made starting from easily available elements and materials, and which, moreover, is very competitive from a mere economic standpoint.

According to one aspect of the present invention, the above mentioned aim and objects, as well as yet other objects, which will become more apparent hereinafter, are achieved by an angular position indicator for remotely displaying the angular positions of elements provided for assuming different angular positions, and in particular valve elements, actuators and the like, characterized in that said angular position indicator comprises an indicator body, which can be coupled to an element an angular position thereof must be displayed, with said body a display being associated which is coupled to said element by means for transforming an angular movement into a rectilinear displacement.

BRIEF DESCRIPTION OF THE DRAWING

Further characteristics and advantages of the present invention will become more apparent from the following detailed disclosure of a preferred, though not exclusive, embodiment of an angular position indicator, which is illustrated, by way of an indicative but not limitative example, in the figures of the accompanying drawings, where.

DESCRIPTION OF THE PREFERRED EMBODIMENTS

Figure 1:
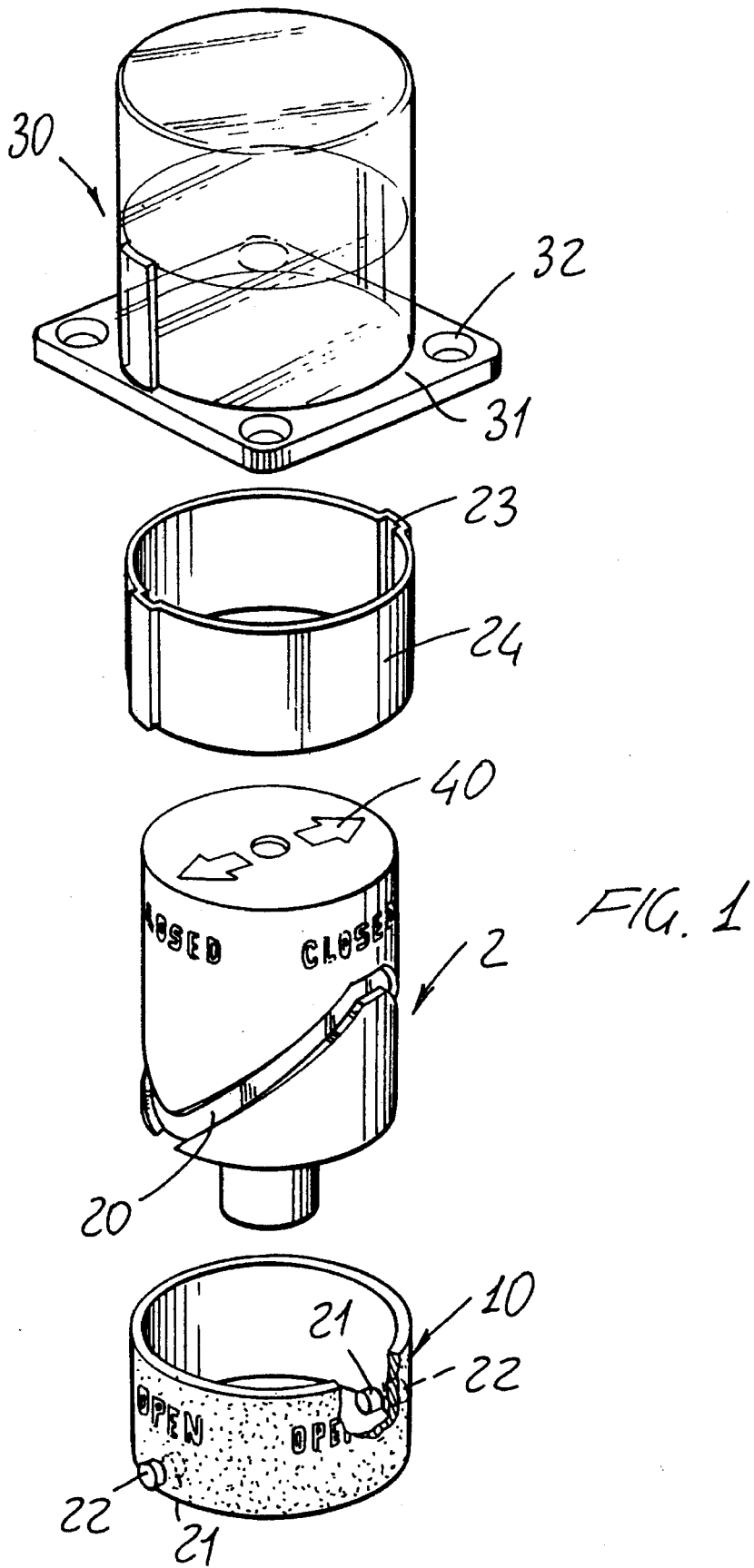
FIG. 1 is a schematic exploded perspective view illustrating the angular position indicator according to the present invention.
Figure 3:
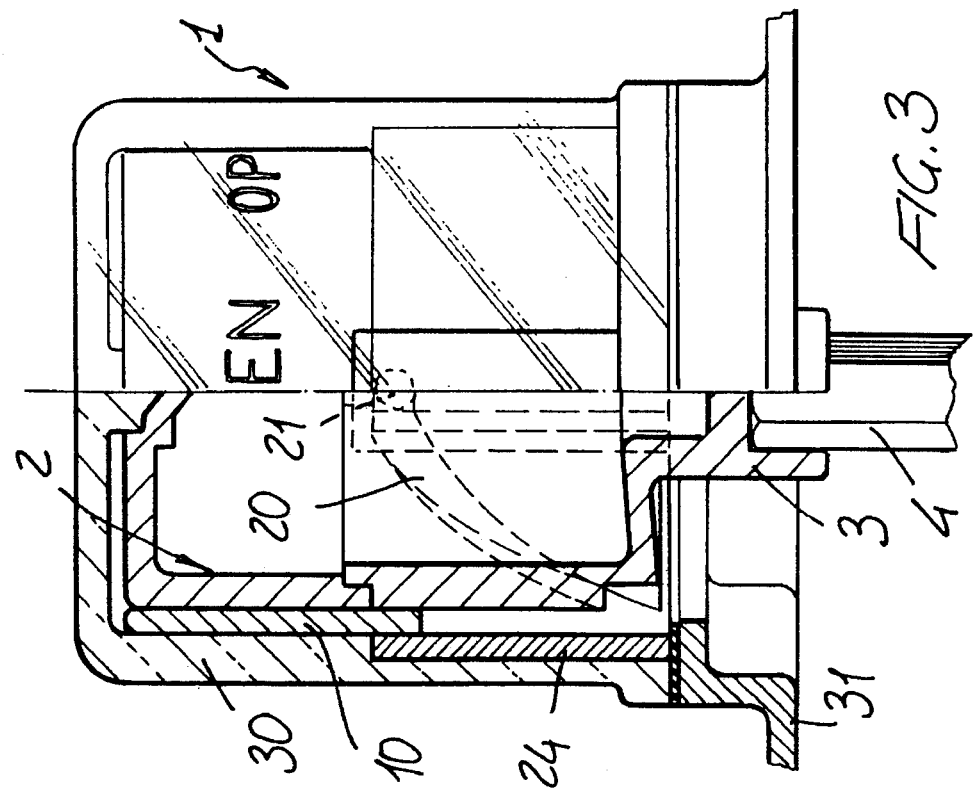
FIG. 3 illustrates a further partially cross-sectioned view of the angular indicator according to the present invention, at an opening position thereof.
Figure 2:
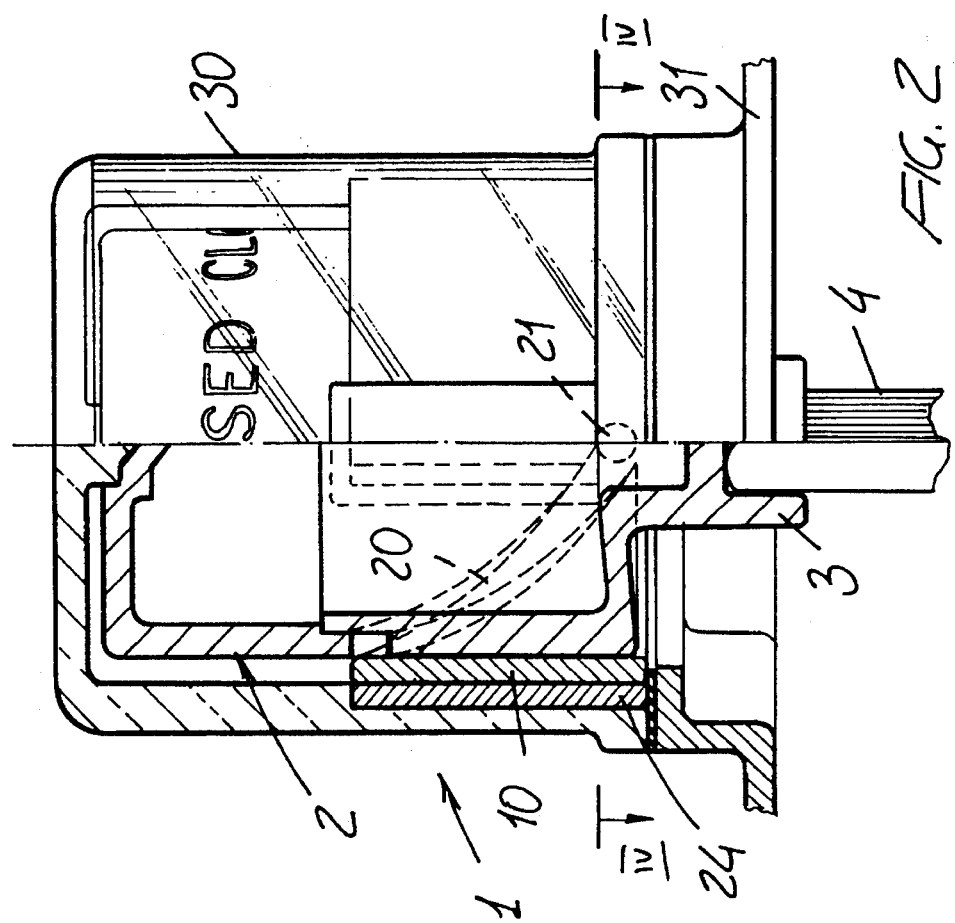
FIG. 2 is a partially cross-sectioned view illustrating the angular position indicator, at a closure position indication condition thereof.
Figure 4:
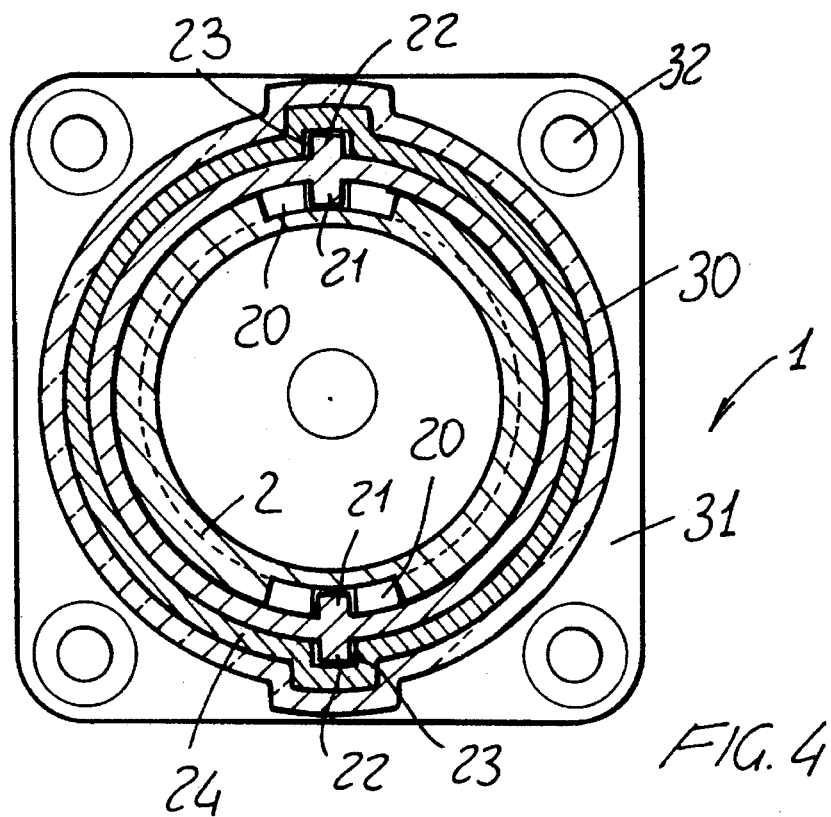
FIG. 4 is a further cross-sectional view substantially taken along the line IV—IV of FIG. 2.
Figure 5:
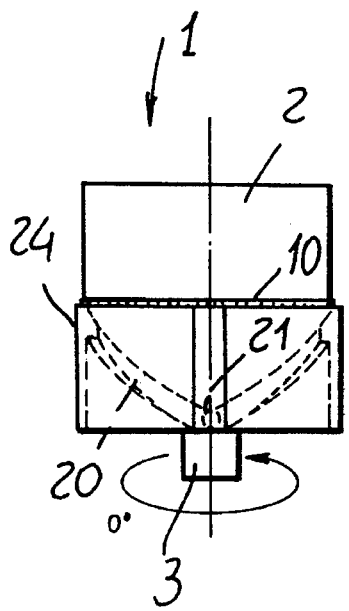
FIGS. 5, 6 and 7 are schematic side elevation views illustrating the angular position indicator respectively at a closure position, that is with a zero rotation angle, at an intermediate position, and at an opening position, that is with a rotary angle of 90°.

With reference to the number references of the figures of the accompanying drawings, the angular position indicator for remotely displaying the angular positions of elements provided for assuming different angular positions, and in particular valve elements, actuators and the like, which has been generally indicated by the reference number 1, comprises an indicator body 2, having a substantially cylindrical shape, which, at an axial end portion thereof, is provided with an end piece 3, for coupling said indicator body with a stem or pin 4 of the element the angular position thereof must be controlled.

with said body 2 is associated a display 10, having substantially a ring-like configuration, and which can be displaced by a rectilinear motion, so as to display to the outside, by a different displacement or translation, the angular displacement of the body 2.

To that end, are provided means for transforming the angular motion of the stem 4 into a rectilinear displacement of the display 10.

According to a preferred, though not limitative, embodiment, this means comprise a recess 20, having a sinusoidal configuration, which, in the case of valve elements performing a rotary motion of 90° between the opened and closed conditions thereof, is provided, on the circumferential contour thereof, with two maxima and two minima, which are diametrically arranged with respect to one another.

In the sinusoidal recess 20 there are engaged diametrical pins 21, extending inside the display 10.

In order to prevent the display 10 from rotating, are provided corresponding outer pins or pegs 22, which engage in rectilinear guides 23, formed on a fixed ring element 24 which is held at a set position by a cup 30, provided with a flange 31 having holes 32 for connecting said cup to the outer casing of the element the rotary motion thereof must be displayed.

Moreover, on the base of the indicator body 2 there is provided an arrow mark, indicated by the reference number 40, which allows the position of the valve to be seen also from the front.

With the disclosed arrangement, the display 10, in a closure condition of the valve, will be located inside the fixed body 24 and it will not be exposed to the outside, whereas, from the outside, it is possible to see the projecting portion of the indicator body 2.

By rotatively driving the stem 4, the pins 21 will be engaged in the slot 20, so as to drive the display 10.

Figure 6:
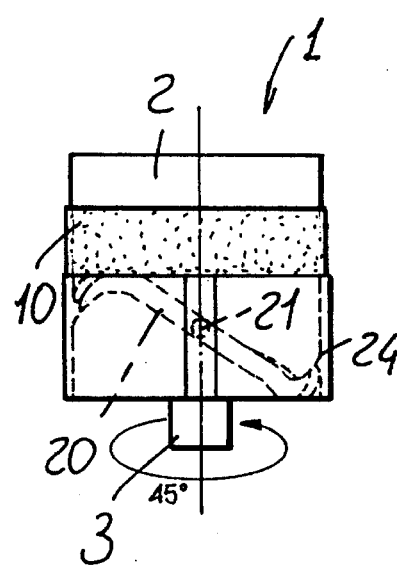

Thus, it will be possible to see the display 10 laterally, owing to the ring-like configuration thereof, which will allow to clearly display also partial openings, as is schematically shown in FIG. 6.

Figure 7:
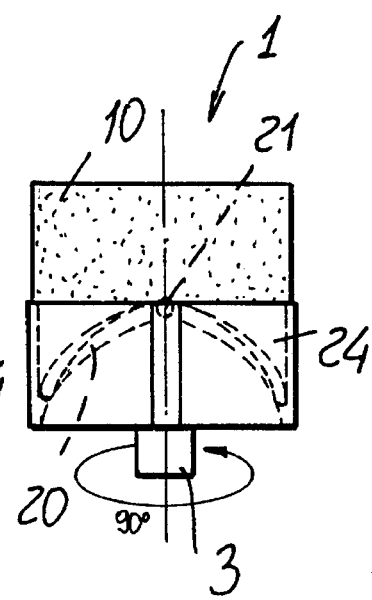

In the case of a full opening, as shown in FIG. 7, the ring-like element 10 will fully cover the body 2 and, accordingly, will allow to clearly see from the outside the position assumed by the valve element therewith it is associated.

Preferably, the indicator body 2 and display 10 will be colored with different colors, so as to better display the position of the display 10 owing to a chromatic contrast.

From the above disclosure it should be apparent that the invention fully achieved the intended aim and objects.

In particular, the fact is to be pointed out that an angular position indicator has been provided which, in addition to allowing to clearly see the intermediate positions of the valve, also allows to see these positions from any desired angle.

Another important feature of the invention is that the disclosed connection will prevent slips or errors from occurring.

Thus, the provided indication will be very accurate and precise.

The invention, as disclosed, is susceptible to several modifications and variations, all of which will come within the scope of the invention.

Moreover, all of the details can be replaced by other technically equivalent elements.

In practicing the invention, the used materials, as well as the contingent size and shapes, can be any, depending on requirements.

I claim:

1. An angular position indicator for remotely displaying a plurality of positions of a valve element having an outer casing, said angular position indicator comprising a cup housing, a substantially cylindrical indicator body which can be removably coupled to said valve element, a ring-like display element having an outside surface and an inside surface connected to an outside portion of said indicator body by means for transforming an angular movement of said indicator body into a rectilinear displacement of said ring like display element, said means for transforming comprising a sinusoidal slot defined on said indicator body and a pair of pins fixedly attached to said inside surface of said display element and slidably engaging in said sinusoidal slot, said display element being located inside a ring-like fixed body encompassed by said cup housing of said indicator.

2. An angular position indicator according to claim 1, wherein said indicator further comprises rotation preventing means for preventing said display element from rotating, said rotation preventing means including a pair of pegs fixedly attached to said outside surface of said display element and each engaging in a guide slot defined in said ring-like fixed body.

3. An angular position indicator, according to claim 1, wherein said cup housing of said indicator is made of an optically clear material, said housing having a flange including throughgoing holes for coupling said housing to said outer casing of said valve element.

4. An angular position indicator, according to claim 1, wherein said sinusoidal slot has two maxima arranged diametrically opposed to each other, and two minima arranged diametrically opposed to each other.

* * * * *